United States Patent
Okano et al.

(10) Patent No.: US 9,391,421 B2
(45) Date of Patent: Jul. 12, 2016

(54) OPTICAL AMPLIFICATION APPARATUS, OPTICAL TRANSMISSION APPARATUS, AND OPTICAL TRANSMISSION SYSTEM

(71) Applicant: FUJITSU LIMITED, Kawasaki-shi, Kanagawa (JP)

(72) Inventors: Satoru Okano, Yokohama (JP); Yoshito Kachita, Kawasaki (JP)

(73) Assignee: FUJITSU LIMITED, Kawasaki (JP)

(\*) Notice: Subject to any disclaimer, the term of this patent is extended or adjusted under 35 U.S.C. 154(b) by 0 days.

(21) Appl. No.: 14/829,939

(22) Filed: Aug. 19, 2015

(65) Prior Publication Data

US 2016/0094007 A1  Mar. 31, 2016

(30) Foreign Application Priority Data

Sep. 30, 2014 (JP) ................................. 2014-202176

(51) Int. Cl.

| | |
|---|---|
| *H01S 3/00* | (2006.01) |
| *H01S 3/102* | (2006.01) |
| *H01S 3/094* | (2006.01) |
| *H01S 3/0941* | (2006.01) |
| *G02B 6/293* | (2006.01) |

(52) U.S. Cl.
CPC ............ *H01S 3/1022* (2013.01); *G02B 6/2938* (2013.01); *H01S 3/0941* (2013.01); *H01S 3/094003* (2013.01); *H01S 3/094096* (2013.01)

(58) Field of Classification Search
CPC . H01S 3/1301; H01S 3/06754; H01S 3/1305; H01S 3/10015
USPC .......................................................... 359/337
See application file for complete search history.

(56) References Cited

U.S. PATENT DOCUMENTS

| | | | |
|---|---|---|---|
| 6,538,803 B1 | 3/2003 | Kagi | |
| 7,843,631 B2 * | 11/2010 | Onaka | .................... H01S 3/1301 359/341.41 |
| 2012/0008956 A1 | 1/2012 | Fukazawa | |

FOREIGN PATENT DOCUMENTS

| | | |
|---|---|---|
| JP | 2001-086071 | 3/2001 |
| JP | 2010-124266 | 6/2010 |
| WO | 2010/107061 | 9/2010 |

\* cited by examiner

*Primary Examiner* — Mark Hellner
(74) *Attorney, Agent, or Firm* — Fujitsu Patent Center

(57) ABSTRACT

An optical amplification apparatus that amplifies input wavelength-division multiplexed light includes a pump light source that outputs pump light, and an optical amplifier that amplifies the wavelength-division multiplexed light in response to a power level of the pump light. The number of wavelengths multiplexed in the wavelength-division multiplexed light is equal to or less than the maximum available number of wavelengths input to the optical amplification apparatus. The power level of the pump light is determined based on the maximum available number of wavelengths.

10 Claims, 17 Drawing Sheets

OPTICAL AMPLIFICATION APPARATUS, OPTICAL TRANSMISSION APPARATUS, AND OPTICAL TRANSMISSION SYSTEM

CROSS-REFERENCE TO RELATED APPLICATION

This application is based upon and claims the benefit of priority of the prior Japanese Patent Application No. 2014-202176, filed on Sep. 30, 2014, the entire contents of which are incorporated herein by reference.

FIELD

The embodiment(s) discussed herein is related to an optical amplification apparatus, an optical transmission apparatus and an optical transmission system.

BACKGROUND

In a technical field of an optical communication, a communication capacity or a transmission distance are expanded. The communication capacity can be expanded by, for example, using a wavelength-division multiplexing (WDM) technique. The transmission distance can be expanded by using an optical amplifier such as an erbium-doped optical fiber amplifier (EDFA).

D1: JP 2001-86071 A
D2: WO 2010/107061
D3: JP 2010-124266 A

Since the optical amplifier is easy to generate noise light such as ASE (Amplified Spontaneous Emission) light, when signal light is amplified by the optical amplifier, an optical signal noise ratio (OSNR) of the signal light is easy to deteriorate.

Hence, when a plurality of optical amplifiers is applied to an optical transmission system to amplify and relay signal light at multiple stages, for example, the OSNR of the signal light may cumulatively deteriorates and may fall below a tolerance of an intermediate transmission section (which may also be referred to as a "span") of the optical transmission system.

When the OSNR falls below the tolerance, even if light can be received, an optical receiver would be unavailable to accurately demodulate and identify a signal received by the light. Hence, there is a limit on expanding a transmission distance by using the optical amplifier.

In order to further expand a transmission distance, a regenerator may be applicable to the optical transmission system. The regenerator converts received signal light into an electrical signal, performs a signal regeneration processing such a signal waveform shaping of the electrical signal, converts the regenerated electrical signal into a signal light again, and transmits (or relays) the signal light. Thus, it is possible to improve the OSNR of the signal light and to expand the transmission distance of the signal light.

However, when the regenerator is applied to the optical transmission system, a cost of the optical transmission system may increase. For example, the regenerator available to regenerate and relay signal light with equal to or more than 100 Gbps is costly. Therefore, the optical transmission system introduced the regenerator would have a big cost impact.

Meanwhile, the OSNR of the signal light can be improved by increasing a gain of the optical amplifier to increase transmission optical power. However, in a WDM optical transmission system, transmission optical power of signal light per wavelength tends to decrease as the number of multiplexed wavelengths increases.

Hence, in order to expand a transmission distance of WDM light by increasing a gain of the optical amplifier without using the regenerator, it would be effective to increase pump light power of the optical amplifier according to the number of multiplexed wavelengths of WDM light.

The pump light power can be increased by increasing the number of pump light sources (e.g., semiconductor laser diodes (LDs)) or by applying a pump light source with high performance and high output power. However, these approaches would increase a cost of the optical amplifier, and therefore, a cost of the optical transmission system would also increase.

SUMMARY

According to an aspect, an optical amplification apparatus amplifies input wavelength-division multiplexed light. The optical amplification apparatus may include a pump light source that outputs pump light, and an optical amplifier that amplifies the wavelength-division multiplexed light in response to a power level of the pump light. The number of wavelengths multiplexed in the wavelength-division multiplexed light is equal to or less than the maximum available number of wavelengths input to the optical amplification apparatus. The power level of the pump light may be determined based on the maximum available number of wavelengths.

Further, according to another aspect, the optical amplification apparatus may be provided to an optical transmission apparatus. Furthermore, according to still another aspect, the optical transmission apparatus including the optical amplification may be one of a plurality of optical transmission apparatuses in an optical transmission system.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
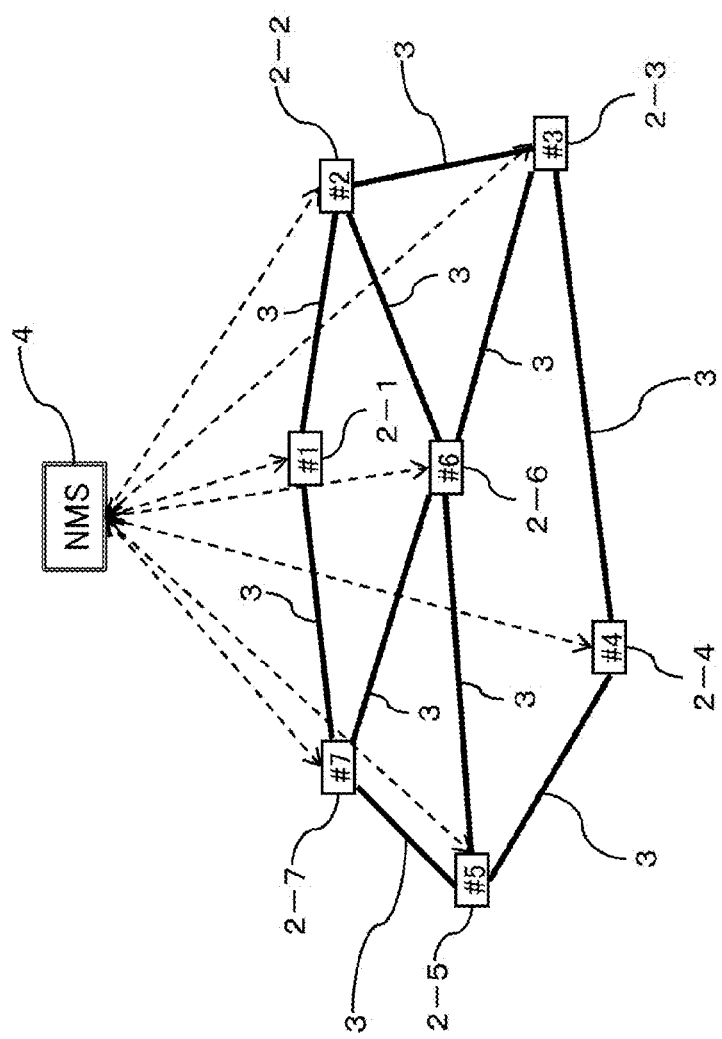
FIG. 1 is a block diagram illustrating an exemplary configuration of an optical transmission system according to an embodiment.

An embodiment will be described with reference to the drawings. In this regard, the embodiment described below is an exemplary embodiment, and does not intend to exclude various modifications and application of techniques that are not explicitly described below. Further, various exemplary aspects described below may be appropriately combined and carried out. In addition, in the drawings used in the following embodiment, components assigned the same reference numerals will indicate the same or similar components unless otherwise specified.

FIG. 1 is a block diagram illustrating an exemplary configuration of an optical transmission system according to an embodiment. An optical transmission system (which may also be referred to as an optical network) 1 illustrated in FIG. 1 includes, for example, a plurality of optical transmission apparatuses 2-1 to 2-*n* (#1 to #n) (n is a natural number and n=7 in FIG. 1). An "optical transmission apparatus" may be referred to as a "node" or a "station". When the nodes 2-1 to 2-*n* are not necessary to be distinguished each other, the nodes 2-1 to 2-*n* may be simply referred to as "nodes 2".

The nodes 2 may be optically and communicably connected with each other through optical transmission lines 3. The optical network 1 illustrated in FIG. 1 is an example of an optical mesh network in which the nodes 2 are connected in a mesh pattern. In this regard, the optical network 1 may be a network with another configuration (which may also be referred to as a topology) such as a ring network.

An optical fiber may be applicable to the optical transmission line 3 which connect the nodes 2. The optical fiber applicable to the optical transmission lines 3 may be a single mode fiber such as an SSMF (Standard Single Mode Fiber), an NZ-DSF (Non Zero Dispersion Sifted Fiber) or a DSFs (Dispersion Sifted Fiber).

The optical communication between the nodes 2 may be a bidirectional optical communication. In the bidirectional optical communication, the optical transmission line 3 may include a pair of optical fibers corresponding to two directions. Light transmitted in the optical transmission line 3 may be, for example, wavelength-division multiplied light (WDM light) obtained by multiplexing lights having a plurality of wavelengths (which may be referred to as "channels").

Each of the nodes 2 may be connected to a NMS (Network Management System) 4 as indicated by dotted lines in FIG. 1. The NMS 4 may communicate with one of the nodes 2 to perform a maintenance, an operation and a management (OAM: Operation Administration and Maintenance) on the node 2. The communication may be referred to as an OAM communication.

The OAM communication may include a communication for one of the nodes 2, which is related to a setting or control of the number of wavelengths (in other words, the number of multiplexed wavelengths) included in WDM light.

A part or all of the nodes 2 may include an optical amplifier which amplifies received WDM light. The optical amplifier may be a rare earth-doped optical fiber amplifier such as an EDFA.

The optical amplifier amplifies the WDM light by pump light input to the optical amplifier. An amplification gain of the optical amplifier changes in response to a power level of the pump light, and therefore, transmission optical power (or level) of the WDM light changes.

A power level of pump light (hereinafter, may be simply referred to as "pump light power") may be determined based on the number of wavelengths multiplexed in the WDM light input to the optical amplifier. The WDM light is transmitted from the node 2 to the optical transmission line 3 with transmission power according to the determined pump light power.

In this regard, the number of wavelength multiplexed in WDM light is set (may be referred to as "limited") equal to or less than the maximum available number of multiplexed wavelengths which are possibly input to the optical amplifier. The number of multiplexed wavelengths set (or limited) equal to or less than the maximum available number of multiplexed wavelengths may be referred to as "the setting number of wavelengths" or "the limited number of wavelengths".

Hence, the pump light power level may be determined based on the limited number of wavelengths. The limited number of wavelengths is possible to increase an amplification gain per wavelength even when the pump light power is the same or less than that upon the maximum available number of multiplexed wavelengths.

Accordingly, it is possible to set a higher transmission optical power per wavelength of the node 2 than transmission optical power upon the maximum available number of multiplexed wavelengths. Accordingly, it is possible to improve the reception OSNR of WDM light.

By improving the reception OSNR, it is possible to expand a transmission distance of the WDM light and to reduce the number of regenerator provided in the optical network 1. Accordingly, it is possible to reduce cost of the optical network 1.

Further, it is possible to set higher transmission optical power per wavelength than transmission optical power upon the maximum available number of multiplexed wavelengths.

Accordingly, the node 2 becomes possible to cover large transmission line loss which is originally unavailable for the node 2.

First Configuration Example of Node 2

Figure 2:
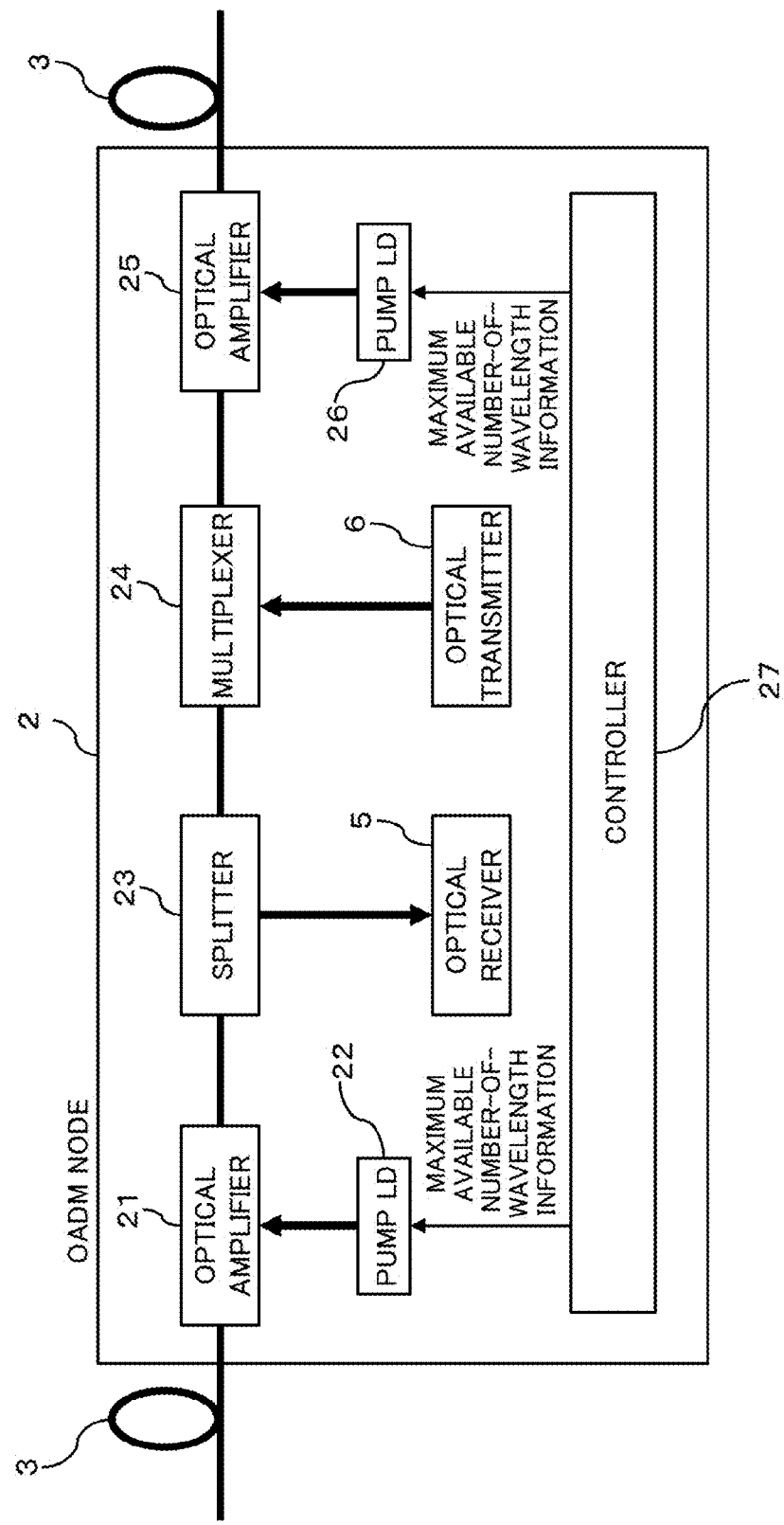
FIG. 2 is a block diagram illustrating a first configuration example of an optical transmission apparatus (e.g. OADM) illustrated in FIG. 1.

FIG. 2 is a block diagram illustrating a first configuration example of the node 2. The node 2 illustrated in FIG. 2 is illustratively an optical add-drop multiplexer (OADM), and may include an optical amplifier 21, a pump light source 22, a splitter (or drop unit) 23, a multiplexer (or add unit) 24, an optical amplifier 25, a pump light source 26, and a controller 27. It may be considered that the node 2 provided with the "optical amplifier" corresponds to an "optical amplification apparatus" (the same applies below).

The optical amplifier 21 may be referred to as a "reception amplifier 21" or a "pre-amplifier 21", and a rare earth optical fiber amplifier such as an EDFA may be applicable thereto. The reception amplifier 21 amplifies WDM light received from the optical transmission line 3 by pump light input from the pump light source 22. The amplification gain of the reception amplifier 21 changes in response to pump light power, and output optical power of the reception amplifier 21 changes. The reception amplifier 21 may be considered as corresponding to a receiver that receives the WDM light from the optical transmission line 3.

The splitter 23 splits light of one or more of wavelengths included in the received WDM light amplified by the optical amplifier 21 to the optical receiver 5, and allows light of the rest of the wavelengths to pass to the multiplexer 24.

Light split to the optical receiver 5 may be referred to as "drop light". The wavelength of the "drop light" may be referred to as the "drop wavelength" or the "received wavelength". Further, light which passes through the multiplexer 24 may be referred to as "through light". The splitter 23 may be illustratively configured by using a wavelength selective switch (WSS) or an optical split coupler.

The optical receiver 5 receives and demodulates the drop light. A "coherent optical receiver" may be applicable to the optical receiver 5. The coherent optical receiver is available to selectively receive and demodulate light of a desired wavelength (or channel) even when light of a plurality of wavelengths is input.

A signal received and demodulated by the optical receiver 5 is illustratively transmitted to a transmission apparatus or a communication apparatus, which is an element of a tributary network. An example of the tributary network is a synchronous digital network compliant to an SDH or a SONET, or the Ethernet (registered trademark). The "SDH" is an abbreviation of a "Synchronous Digital Hierarchy" and the "SONET" is an abbreviation of a "Synchronous Optical NETwork".

The optical transmitter 6 generates and outputs light of a wavelength (which may be referred to as an "add wavelength" or a "transmission wavelength") inserted in WDM light transmitted through the optical transmission line 3. The light of the add wavelength can be illustratively generated by modulating light of the add wavelength with a signal received from the element of the tributary network at an optical modulator (not illustrated). The light of the add wavelength can be illustratively generated by a transmission light source to which an LD is applied. The LD applied to the transmission light source may be an LD with a variable wavelength (may be referred to as a "tunable LD").

Pluralities of optical transmitters 6 and optical receivers 5 may be provided according to the number of add wavelengths and the number of drop wavelengths. Further, the optical transmitter 6 and the optical receiver 5 may be elements of a single transponder. The transponder may be considered as an element of the node 2.

The multiplexer 24 multiplexes the light of the add wavelength transmitted from the optical transmitter 6 to the through light from the splitter 23, and outputs the light to the optical amplifier 25. The light of the add wavelength may be referred to as the "add light". The multiplexer 24 may be illustratively configured by using a WSS or an optical multiplexing coupler.

The optical amplifier 25 may be referred to as the "transmission amplifier 25" or the "post-amplifier 25", and a rare earth optical fiber amplifier such as an EDFA may be illustratively applied thereto. The transmission amplifier 25 amplifies the WDM light input from the multiplexer 24 by pump light input from the pump light source 26. The amplification gain of the transmission amplifier 25 changed according to pump light power, and output optical power of the transmission amplifier 25, in other words, transmission optical power of the WDM light to the optical transmission line 3 changes. The transmission amplifier 25 may be considered as corresponding to a transmitter that transmits the WDM light to the optical transmission line 3.

Semiconductor laser diodes (LD) may be illustratively applicable to the pump light sources 22 and 26 that are examples of pump light sources available to output pump light. Hence, the "pump light source" may be referred to as the "pump LD".

The controller 27 illustratively sets and controls output optical power of the pump LDs 22 and 26, in other words, pump light power to power corresponding to the number of wavelengths (e.g., the limited number of wavelengths) multiplexed in the WDM light. The controller 27 may be shared by or may be individual for the pump LDs 22 and 26 as illustrated in FIG. 2.

Pump optical power of the pump LDs 22 and 26 is illustratively determined based on reception optical power of the WDM light, transmission optical power of the WDM light, the number of received wavelengths and the like, and is designed to provide predetermined transmission optical power upon an operation using the maximum available number of multiplexed wavelengths.

Figure 3:
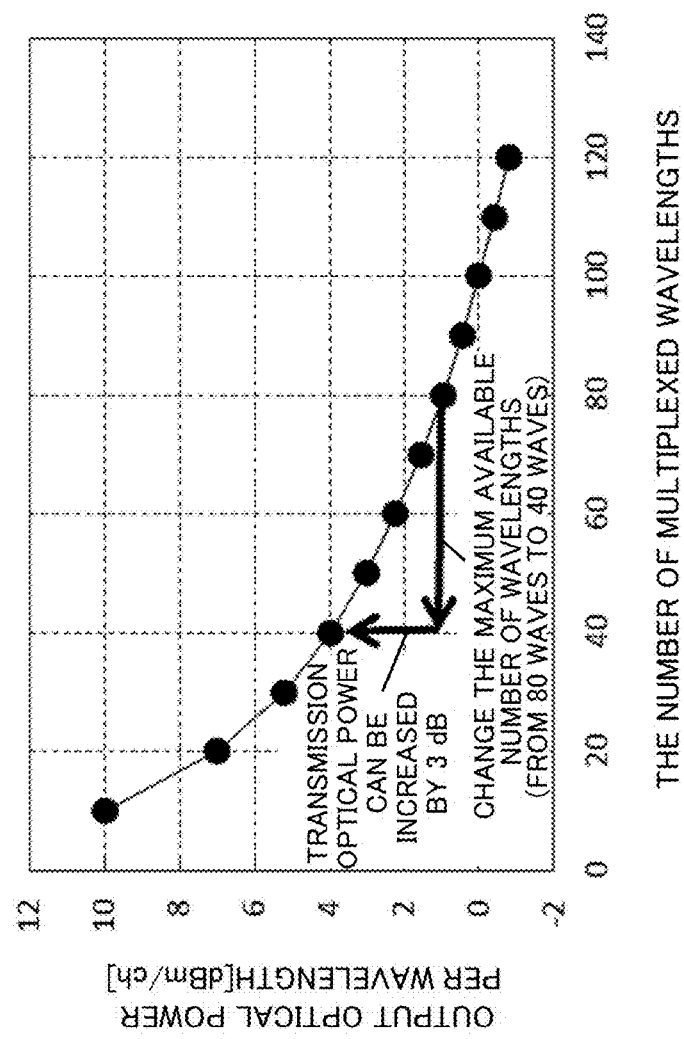
FIG. 3 is a diagram illustrating an example of a change in output optical power per wavelength with respect to the number of multiplexed wavelengths in the optical transmission system illustrated in FIG. 1.

In this regard, as illustrated in FIG. 3, transmission optical power per wavelength available to be output by the optical amplifiers 21 and 25 (in other words, the node 2) tends to increase as the number of wavelengths multiplexed in the WDM light decreases when the pump light power is unchanged.

For example, upon comparison between 40 wavelengths and 80 wavelengths of the number of wavelengths multiplexed in the WDM light, transmission optical power is available to be increased by about 3 dBm upon 40-wavelength-multiplexed light compared to 80-wavelength-multiplexed light when the same pump light power is applied.

In other words, in a situation that the number of wavelengths multiplexed in the WDM light is set (or limited) to 40 wavelengths smaller than 80 wavelengths, even when pump light power is the same or lower than that upon multiplexing of the 80 wavelengths, it is possible to increase transmission optical power per wavelength.

Hence, the controller 27 is available to increase transmission optical power per wavelength by determining and controlling pump light power based on information of the number of multiplexed wavelengths set to the WDM light input to the node 2.

In other words, a setting of the maximum available number of wavelengths multiplexed in the WDM light input to the node 2 may be changed for each node 2, in other words, for each transmission span between the nodes 2. Information of the maximum available number of multiplexed wavelengths set for each node 2 may be referred to as the "maximum available number-of-wavelength information" or "setting number-of-wavelength information".

By determining and controlling pump light power based on the maximum available number-of-wavelength information, it is possible to increase transmission optical power per wavelength. Therefore, it is possible to improve the OSNR of the WDM light without increasing the number of pump LDs or without using a pump LD with high performance and high output power. As a result, it is possible to efficiently use existing pump light power and to improve the OSNR at low cost.

By improving the OSNR, it is possible to expand a transmission distance of the WDM light and to reduce the number of regenerators to be introduced to the optical network 1. Accordingly, it is possible to realize the optical network 1 available for a long distance transmission at low cost.

Modified Example of First Configuration Example

In FIG. 2, a pump light power control target may be one or both of the pump LDs 22 and 26. As long as transmission optical power per wavelength of the WDM light transmitted to the optical transmission line 3 is available to be increased in the node 2, a control method and a control target of transmission optical power do not particularly matter (the same applies below).

Further, the setting number-of-wavelength information of WDM light may be illustratively given from the NMS 4 to the controller 27 of the node 2 by way of an OAM communication. The controller 27 is possible to set and control the pump light power in response to a reception of the setting number-of-wavelength information.

The information given to the controller 27 may be, for example, "transmission optical power setting information" or "pump light power setting information" of the target node 2 obtained based on the setting number-of-wavelength information by the NMS 4 instead of the "setting number-of-wavelength information". The "setting information" may be referred to as the "control information".

In other words, the information given to the controller 27 will do as long as information which makes it possible for the node 2 to control transmission optical power per wavelength of the WDM light transmitted to the optical transmission line 3.

Further, the information given to the controller 27 may be transmitted between the nodes 2 not only by the OAM communication, but also by light such as SV (Supervisory) light or OSC (Optical Supervisory Channel) light. Hence, an OAM communication target of the NMS 4 may be a part of all nodes 2 in the optical network 1.

The above-described "modified example of the first configuration example" is applicable to second to sixth configuration examples of the node 2 described below.

Second Configuration Example of Node 2

The node 2 illustrated in FIG. 2 includes both of the reception amplifier 21 and the transmission amplifier 25, yet may be configured to include one of the reception amplifier 21 and the transmission amplifier 25. In other words, setting and controlling pump light power according to the setting number-of-wavelength information may also be applicable to the node 2 which includes any one of the reception amplifier 21 and the transmission amplifier 25.

Figure 4:
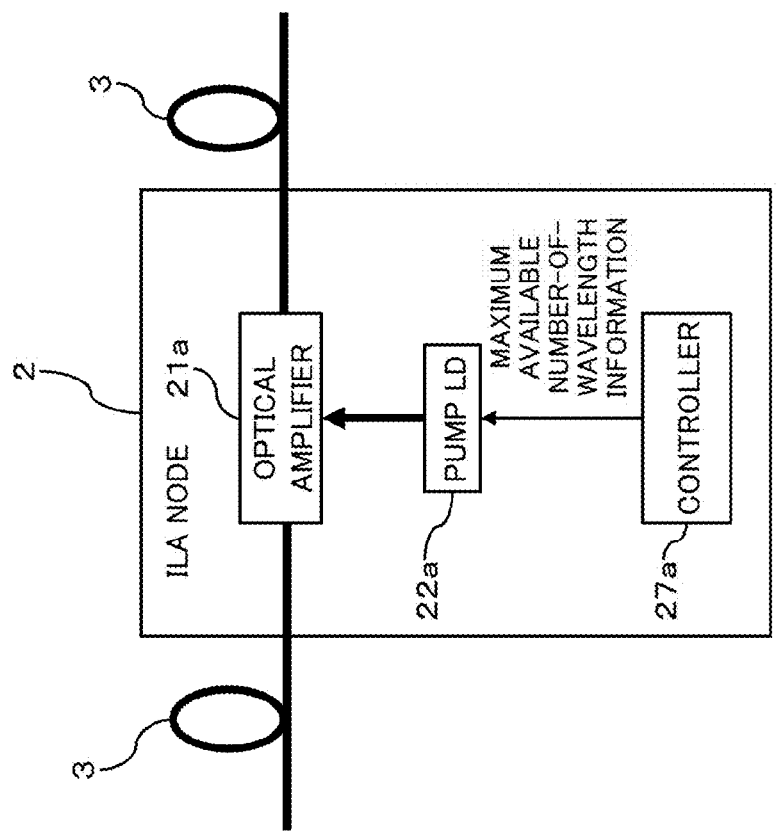
FIG. 4 is a block diagram illustrating a second configuration example of the optical transmission apparatus (e.g. ILA) illustrated in FIG. 1.

Further, as illustrated in FIG. 4, setting and controlling pump light power according to setting number-of-wavelength information may be applied to the relay node 2 which does not include an add/drop function illustrated in FIG. 2. The relay node 2 may be referred to as an in-line amplifier (ILA) node 2.

The ILA node 2 illustratively includes an optical amplifier 21a, a pump light source (or pump LD) 22a and a controller 27a.

The optical amplifier 21a amplifies WDM light received from the input side optical transmission line 3 by pump light input from the pump LD 22a.

The controller 27a sets and controls output optical power of the pump LD 22a to power corresponding to the setting number of wavelengths of the WDM light amplified by the optical amplifier 21a based on the aforementioned setting number-of-wavelength information.

Thus, it is possible to increase transmission optical power per wavelength of the WDM light upon operation using the maximum available number of multiplexed wavelengths. Accordingly, it is possible to improve the OSNR of the WDM light and expand a transmission distance of the WDM light at low cost.

Third Configuration Example of Node 2

Figure 5:
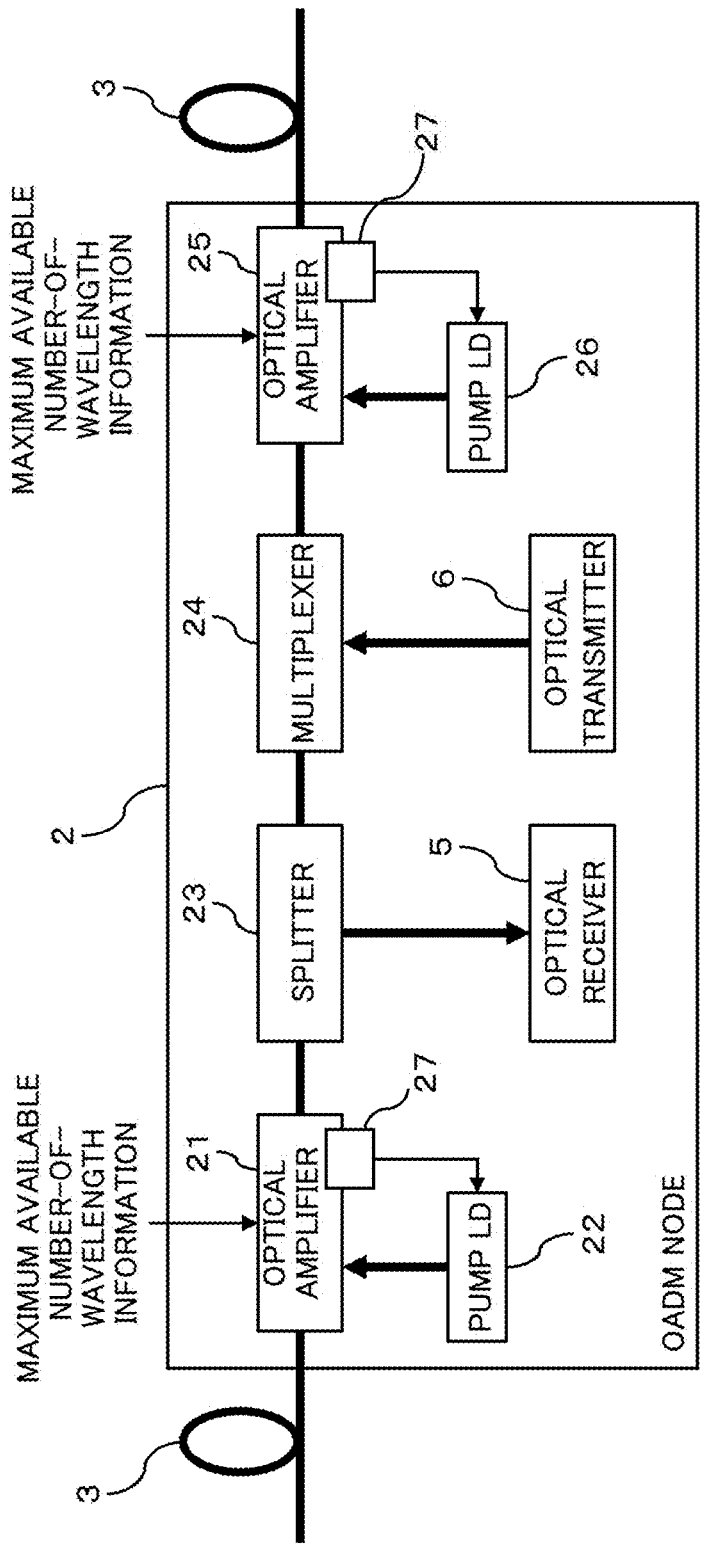
FIG. 5 is a block diagram illustrating a third configuration example of the optical transmission apparatus (e.g. OADM) illustrated in FIG. 1.

In the first configuration example illustrated in FIG. 2, the setting number-of-wavelength information may be given to one or both of the optical amplifiers 21 and 25 as illustrated in, for example, FIG. 5. The optical amplifiers 21 and 25 is available to set and control pump light power of the pump LDs 22 and 26 to power corresponding to the setting number of wavelengths based on the setting number-of-wavelengths information.

In other words, it may be understood that the third configuration example illustrated in FIG. 5 correspond to a configuration in which the function(s) serving as the controller 27 illustrated in FIG. 1 is provided to one or both of the optical amplifiers 21 and 25.

Fourth Configuration Example of Node 2

Cross-connect (XC) information of a wavelength may be set to the multiplexer 24 illustrated in FIG. 2. The cross connect information may include information which makes it possible to identify which wavelength of add light is to be added to the WDM light among wavelengths available in the WDM light.

The multiplexer 24 is possible to adequately add the light with the add wavelength according to the setting to the WDM light based on a setting of the cross connect information. The cross connect information may be illustratively stored in a storage apparatus or a storage medium such as a memory provided to the multiplexer 24.

In this regard, since the cross connect information indicates information of a wavelength available in amplification target WDM light, it is available to identify the setting number-of-wavelength information of the WDM.

Figure 6:
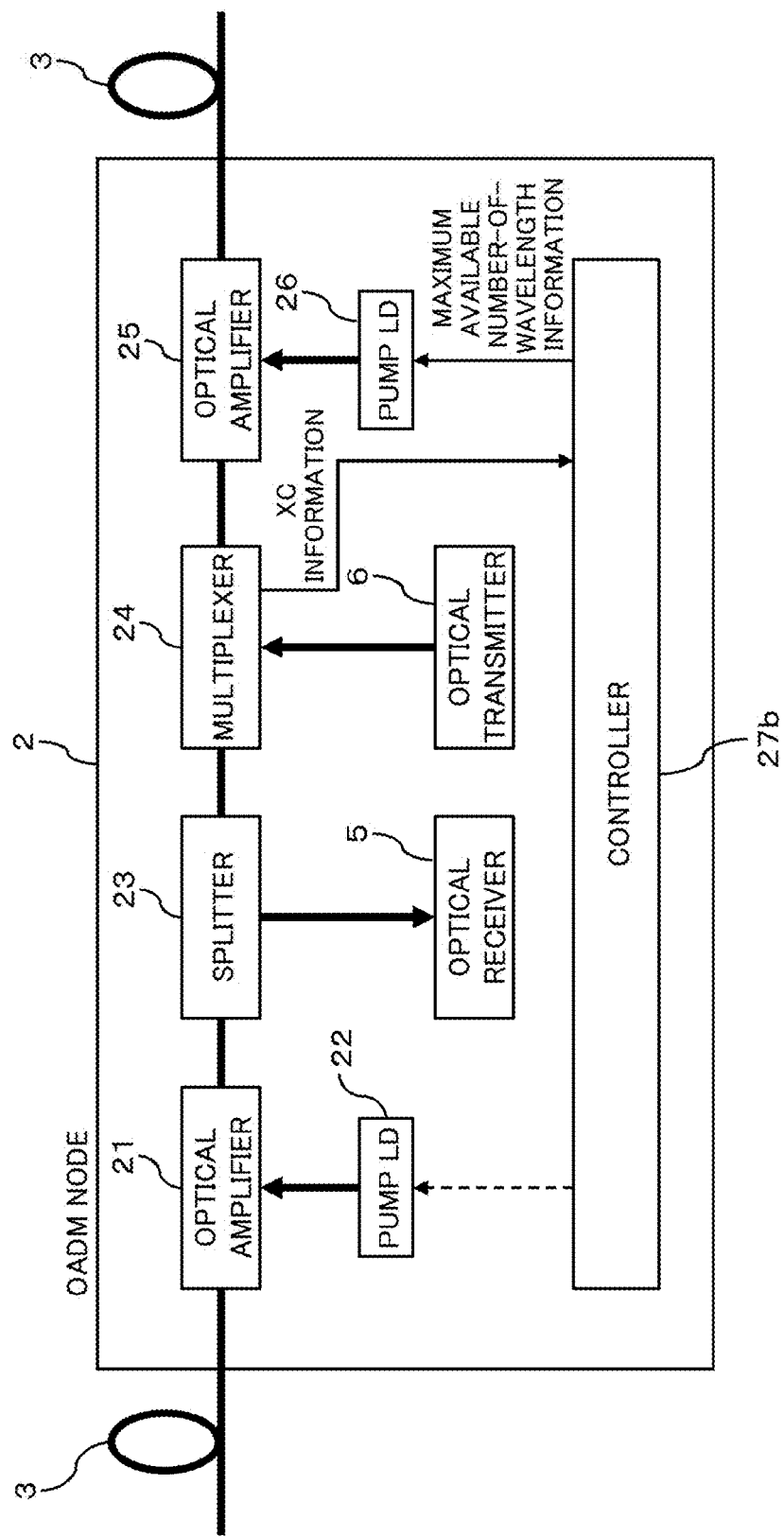
FIG. 6 is a block diagram illustrating a fourth configuration example of the optical transmission apparatus (e.g. OADM) illustrated in FIG. 1.

Accordingly, by obtaining the cross connect information set to the multiplexer 24, the controller 27b illustrated in FIG. 6 is possible to set and control pump light power to power corresponding to the setting number of wavelengths based on the obtained setting number-of-wavelength information.

The cross connect information is an example of information which makes it possible to identify the setting numberof-wavelength information of the WDM light, and it may be considered as corresponding to one piece of apparatus setting information (which may also referred to as "provisioning information") of the node 2. In other words, the controller 27b may identify the setting number-of-wavelength information of the WDM light not only from the cross connect information but also from the apparatus setting information.

Fifth Configuration Example of Node 2

Figure 7:
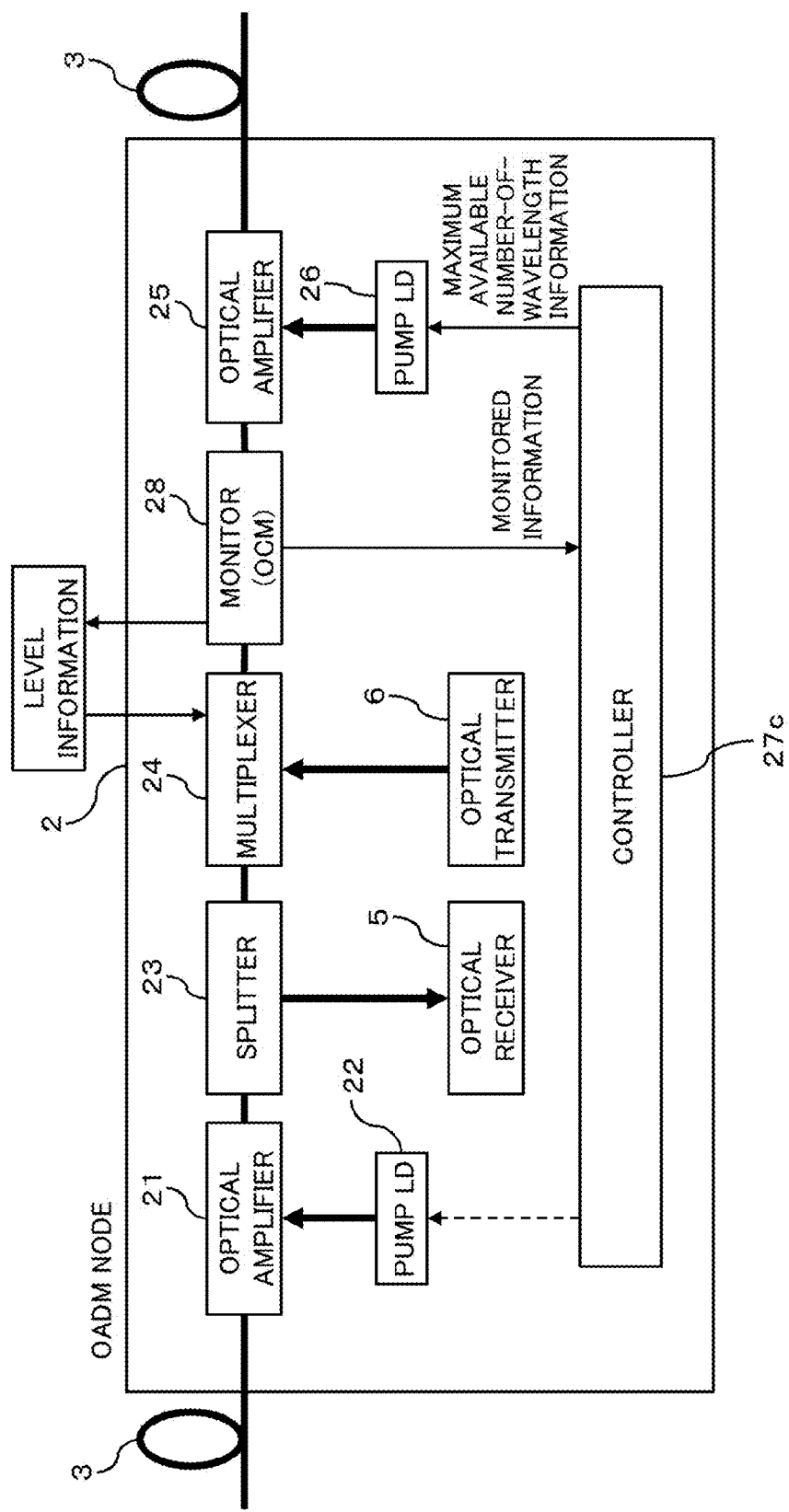
FIG. 7 is a block diagram illustrating a fifth configuration example of the optical transmission apparatus (e.g. OADM) illustrated in FIG. 1.

At a post stage of the multiplexer 24 illustrated in FIG. 2, an optical channel monitor (OCM) 28 may be provided as illustrated in, for example, FIG. 7. The OCM 28 is available to monitor an optical power level per wavelength included in the WDM light. The OCM 28 may be provided in the multiplexer 24.

Information (which may be referred to as "monitored information") monitored by the OCM 28 may be used as information which allows the multiplexer 24 to control an optical power level of each wavelength.

For example, the WSS equipped with a VOA (Variable Optical Attenuation) function which is available to change an optical attenuation amount for each wavelength may be applied to the multiplexer 24. In this case, by controlling the optical attenuation amount (which may be referred to as the "VOA loss") of the WSS based on monitored information of the OCM 28, it is possible to adjust the optical power level for each wavelength in the WDM light.

An example of the WSS equipped with the VOA function is a spatial optical modulation element which uses a LCOS (Liquid Crystal on Silicon) technique or a MEMS (Micro Electro Mechanical System) technique. The spatial optical modulation element can achieve a wavelength selection (or optical switch) function and the VOA function by spatially changing a reflection direction of input light (or beam) to change an internal optical route of the light.

When the node 2 is provided with the OCM 28, it is possible to identify the setting number-of-wavelength information of the WDM light amplified by the optical amplifier 25 from the monitored information of the OCM 28. Accordingly, the controller 27c illustrated in FIG. 7 is possible to set and control pump light power to power corresponding to the setting number of wavelengths based on the identified setting number-of-wavelength information.

Sixth Configuration Example of Node 2

Figure 8:
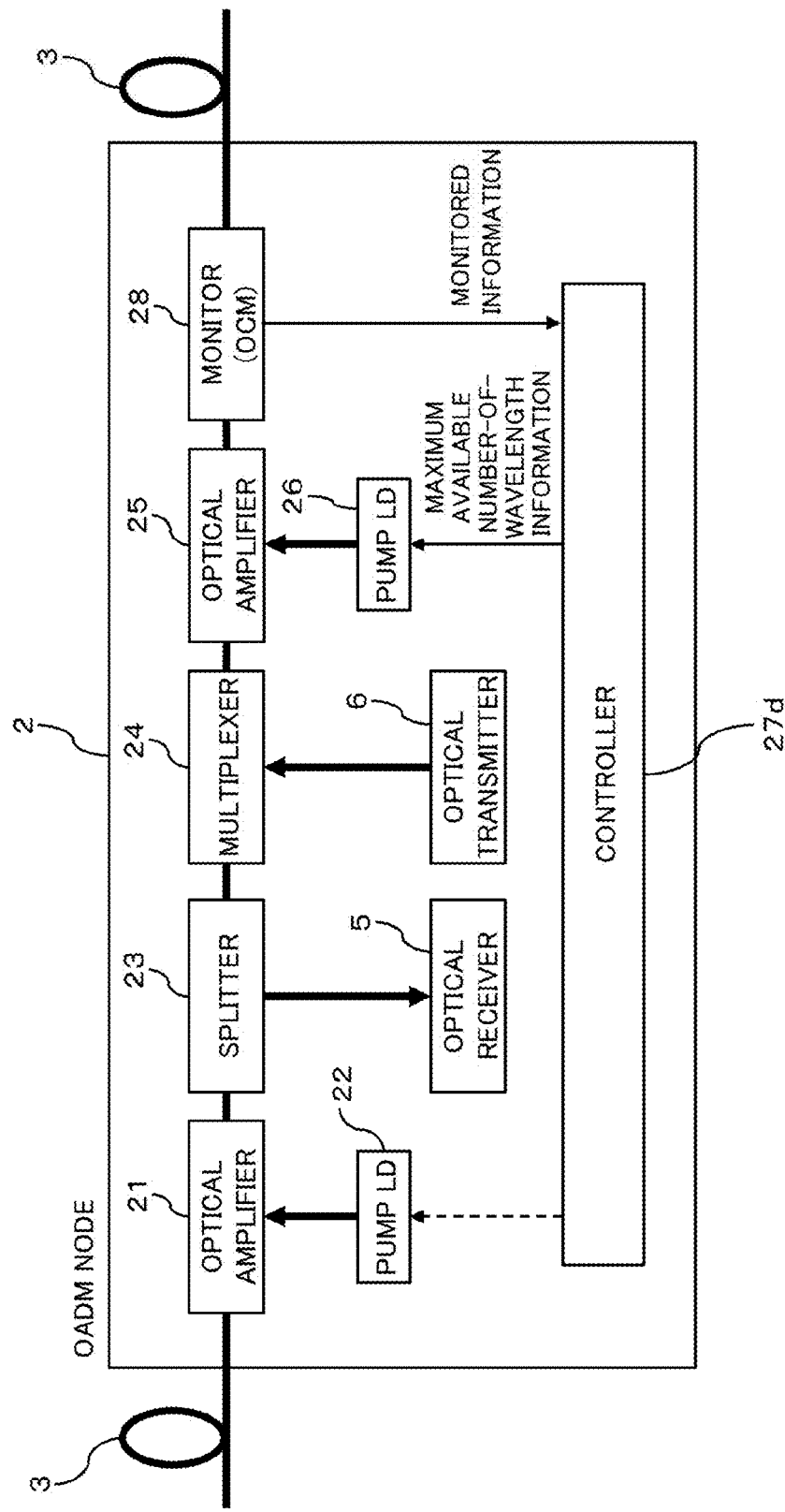
FIG. 8 is a block diagram illustrating a sixth configuration example of the optical transmission apparatus (e.g. OADM) illustrated in FIG. 1.

The OCM 28 illustrated in FIG. 7 may be provided at a post stage of (or inside) the optical amplifier 25 as illustrated in, for example, FIG. 8. Further, the OCM 28 may be provided at a post stage of (or inside) the multiplexer 24 and another OCM 28 may be provided at a post stage of (or inside) the optical amplifier 25.

The OCM 28 illustrated in FIG. 8 is available to monitor an output optical power level of the optical amplifier 25, in other words, a transmission light power level to the optical transmission line 3 for each wavelength in the WDM light. The monitored information of the OCM 28 may be used as information to perform a feedback control on an amplification gain of the optical amplifier 25.

A controller 27d illustrated in FIG. 8 is possible to identify the setting number-of-wavelength information of the WDM light amplified by the optical amplifier 25 based on the monitored information of the OCM 28. Accordingly, the controller 27d is possible to set and control pump light power to power according to the setting number of wavelengths based on the identified setting number-of-wavelength information.

According to the configuration example illustrated in FIGS. 7 and 8, the OCM is used as an example of the monitor 28 available to obtain or identify the setting number-of-wavelength information of the WDM light. However, any other measurement equipment such as an optical spectrum analyzer may be applicable to the monitor 28.

(Monitoring of the Number of Operating Wavelengths)

According to the configuration examples illustrated in FIGS. 6 to 8, it is possible to monitor whether the number of wavelengths (may also be referred to as "the number of operating wavelengths" for descriptive purpose) obtained or identified from the cross connect information or the monitored information is equal to or less than the desired setting number of wavelengths. "The desired setting number of wavelengths" illustratively means the number of wavelengths set (or limited) as the maximum available number of operating wavelengths to the node 2.

In response to a detection that the number of operating wavelengths exceeds the desired setting number of wavelengths as a result of the monitor, the node 2 may output an alarm to the NMS 4 or an external device, for example. The monitor function and the alarm output function may be provided to the controllers 27b, 27c or 27d, or may be provided to the multiplexer 24.

Figure 9:
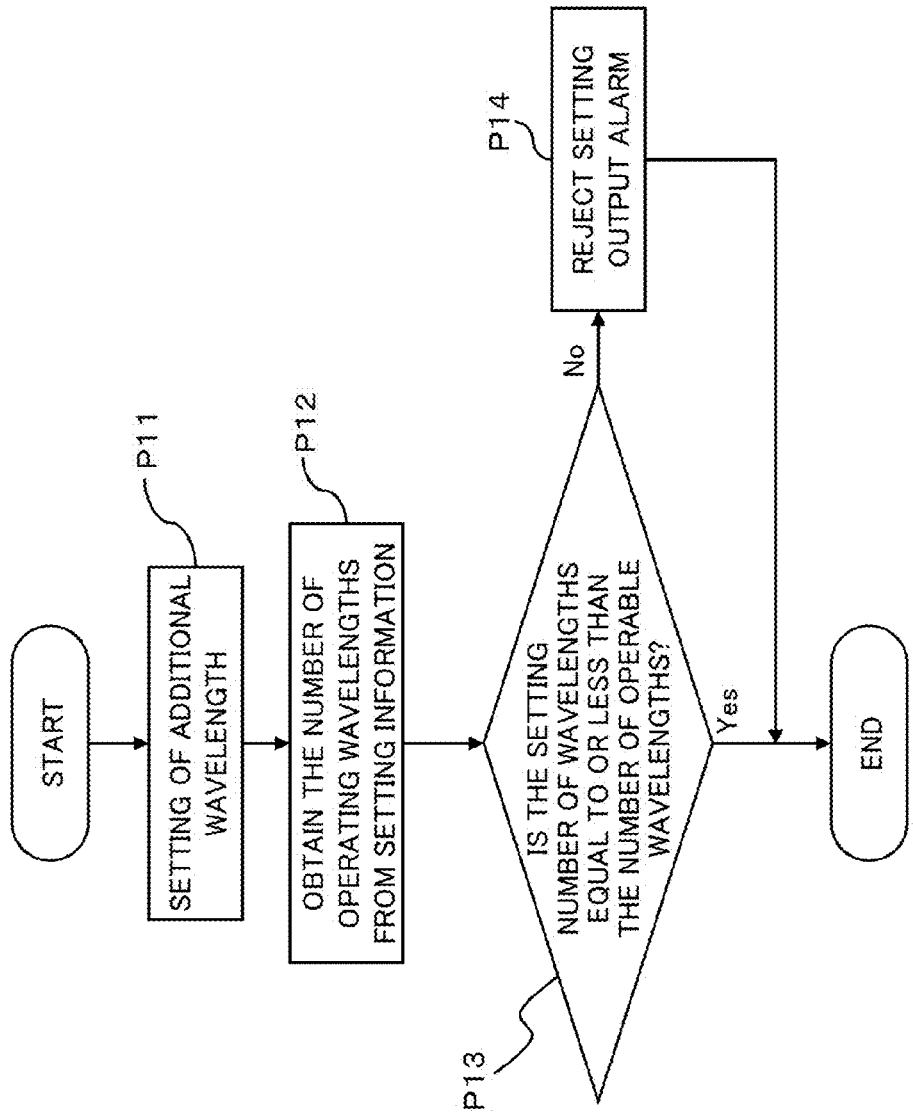
FIG. 9 is a flowchart illustrating an example of a number-of-operating wavelength monitor processing in the optical transmission apparatus illustrated in FIG. 6.

FIG. 9 illustrates an example of a processing of monitoring the number of operating wavelengths in the configuration example illustrated in FIG. 6. As illustrated in FIG. 9, when the number of wavelengths multiplexed in the WDM light is increased, a connection setting for an additional wavelength is performed on the multiplexer 24 (processing P11). The connection setting is reflected in the cross connect information, for example.

The controller 27b is possible to identify the number of operating wavelengths whose connection settings are actually made in the multiplexer 24 based on the cross connect information (processing P12). The controller 27b checks whether the identified number of operating wavelengths is equal to or less than the desired setting number of wavelengths (processing P13).

In response to a detection that the number of operating wavelengths is equal to or less than the desired setting number of wavelengths as a result of the check (Yes in processing P13), the controller 27b acknowledges the connection setting in the processing P11 and may terminate the processing.

Meanwhile, in response to a detection that the number of operating wavelengths exceeds the desired setting number of wavelengths (No in processing P13), the controller 27b may reject the connection setting in the processing P11 and output an alarm to, for example, the NMS 4 or the external device (processing P14).

In this way, the controller 27b is available to check whether the number of operating wavelengths is appropriately set to the node 2 (e.g., multiplexer 24). Therefore, it is possible to prevent an erroneous setting in which the number of wavelengths exceed the desired setting number of wavelengths. Accordingly, it is possible to prevent deterioration of transmission performance of the WDM light due to the erroneous setting.

According to the configuration examples illustrated in FIGS. 7 and 8, it is possible to identify the number of operating wavelengths from the monitored information of the OCM 28. Therefore, the controller 27c or 27d is available to perform the aforementioned monitor processing including a rejection of the connection setting or an output of the alarm based on the identified number of operating wavelengths.

First Example of Application to Optical Transmission System 1

Figure 10:
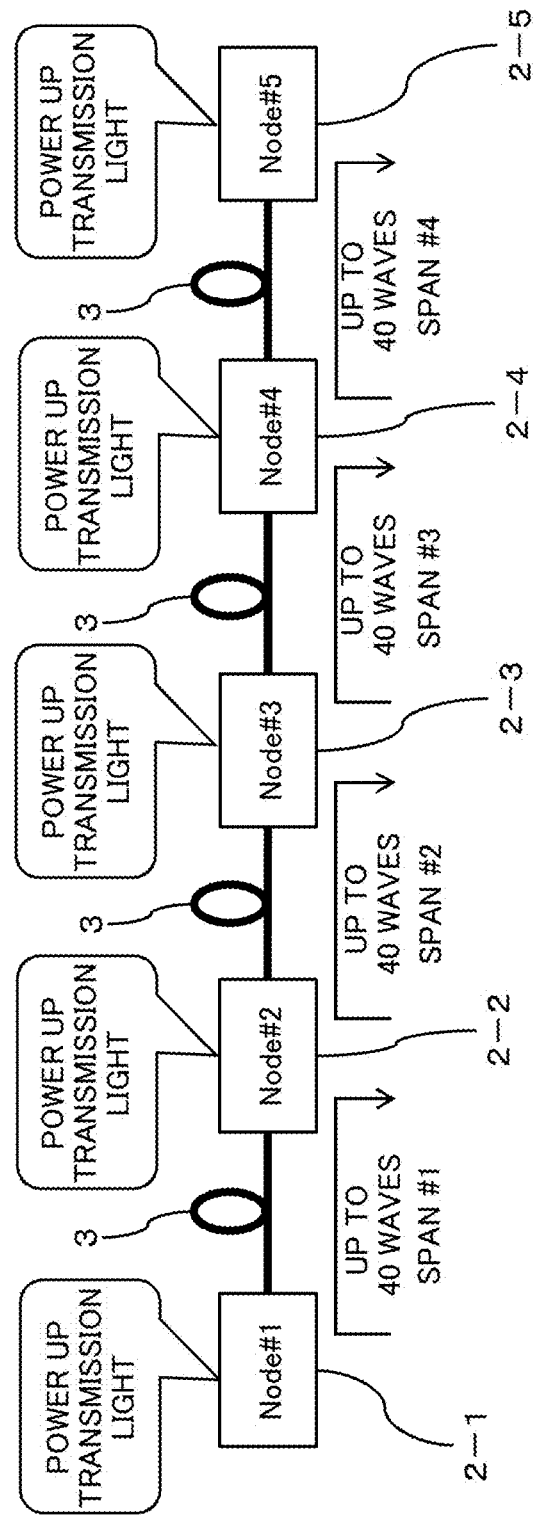
FIG. 10 is a block diagram illustrating an exemplary configuration of the optical transmission system focusing on an optical path going through a plurality of nodes illustrated in FIG. 1.

FIG. 10 is a block diagram illustrating an exemplary configuration of the optical transmission system 1 focusing on an optical route going through the nodes 2-1 to 2-5 illustrated in FIG. 1. Each of the nodes 2-1 to 2-5 may be any one of an OADM node, an ILA node and a HUB node.

In the example illustrated in FIG. 10, it is assumed that the number of operating wavelengths of WDM light transmitted from the node 2-1 to the node 2-5 is limited from 80 wavelengths to 40 wavelengths.

Figure 11:
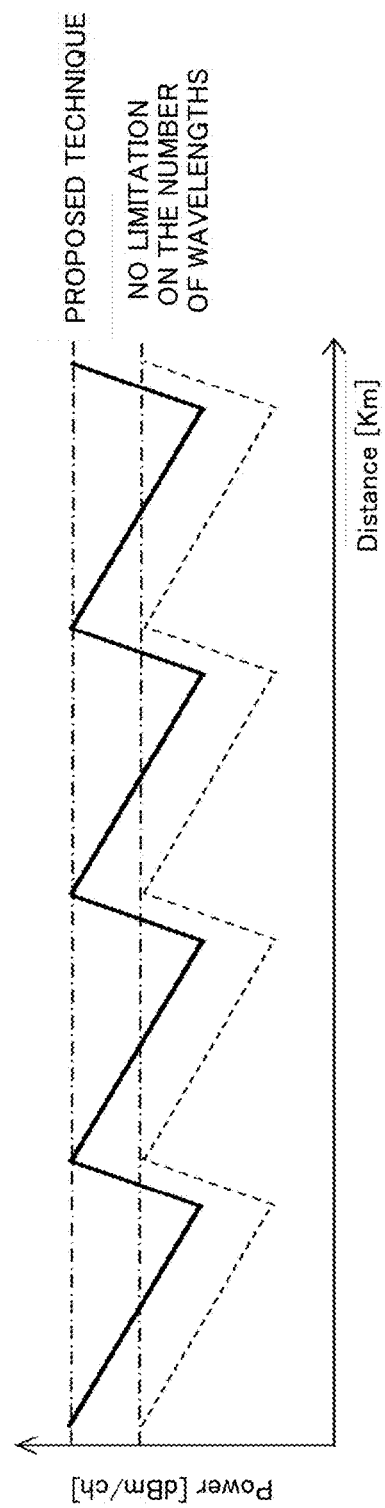
FIG. 11 is a diagram illustrating an example of a change (or level diagram) in optical power according to a transmission distance before and after the number of wavelengths is limited in the optical transmission system illustrated in FIG. 1.
Figure 12:
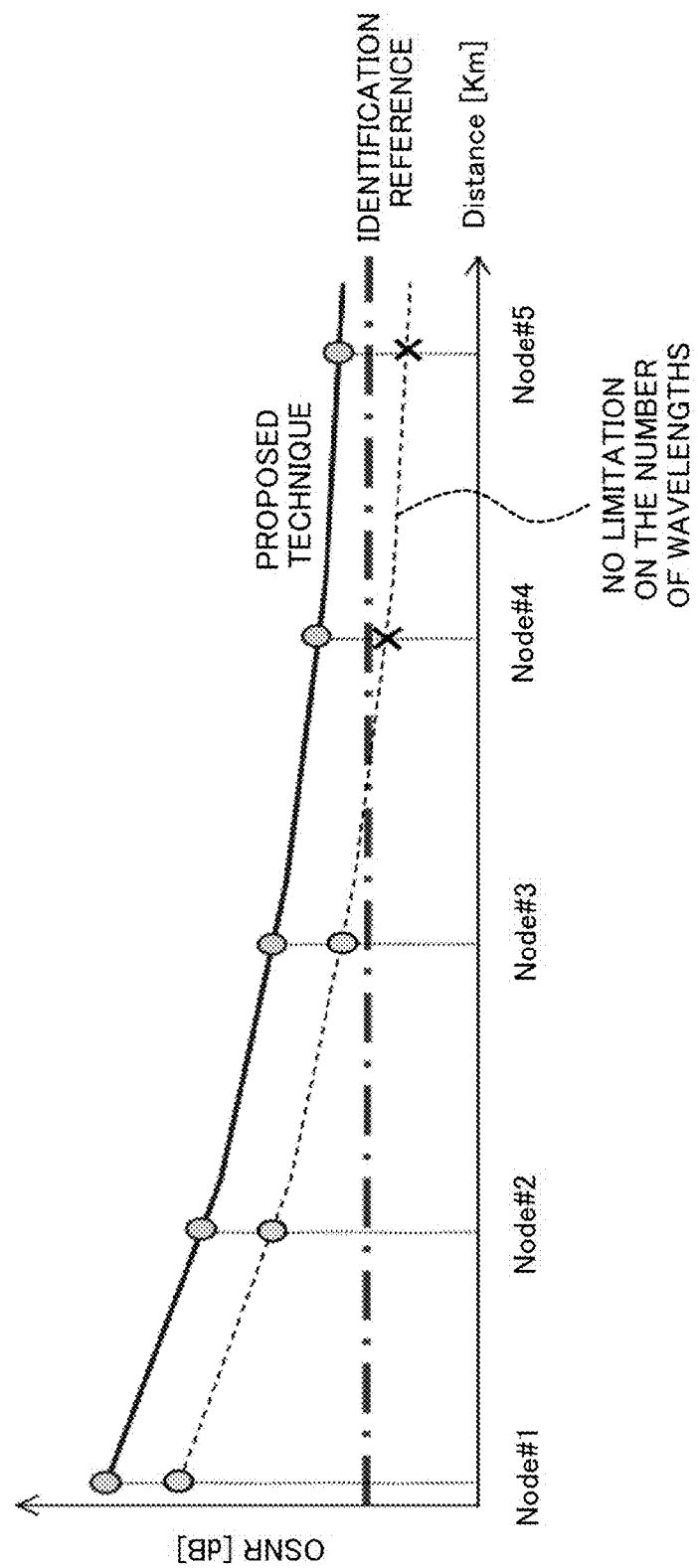
FIG. 12 is a diagram illustrating an example of a change in the OSNR according to a transmission distance before and after the number of wavelengths is limited in the optical transmission system illustrated in FIG. 1.

FIG. 11 illustrates an example of a change (or a level diagram) in optical power according to a transmission distance before and after the number of wavelengths is limited. FIG. 12 illustrates an example of a change in an OSNR according to a transmission distance before and after the number of wavelengths is limited. In FIGS. 11 and 12, changes (or characteristics) indicated by dotted lines indicate changes before the number of wavelengths is limited, and changes (or characteristics) indicated by solid lines indicate changes after the number of wavelengths is limited.

As illustrated in FIGS. 10 and 11, each node 2 sets and controls pump light power to power corresponding to the limited number of wavelengths (e.g. 40 wavelengths) as described above, and therefore, transmission optical power per wavelength of each node 2 increases compared to that of 80 wavelengths.

Accordingly, as illustrated in FIG. 12, the OSNR of the WDM light is also improved compared to that of the 80 wavelengths, and therefore, it is possible to increase the reachable number of nodes through which the WDM light is reachable while preventing the reception OSNR from falling below the lower limit value of a predetermined allowable range. The "lower limit value" may be referred to as an "identification reference (or a determination reference)" available to correctly demodulate and identify received signal light in units of symbols, for example.

For example, in FIG. 12, when 80 wavelengths are multiplexed in the WDM light, the reception OSNRs at the node 2-1 to the node 2-3 do not fall below the identification reference. Therefore, it is possible to correctly demodulate and identify the received signal light. However, the reception OSNRs at the nodes 2-4 and 2-5 positioned in the downstream of the node 2-3 fall below the identification reference. Therefore, it is not possible to correctly demodulate and identify the received signal light. Hence, the node 2-3 would be configured as a regenerator node provided with a regenerative relay function.

In contrast, when 40 wavelengths are multiplexed in the WDM light, the reception OSNRs are improved, and therefore, the reception OSNRs at the nodes 2-4 and 2-5 do not fall below the identification reference, for example. Accordingly, it is possible to correctly demodulate and identify received signal light at both of the nodes 2-4 and 2-5.

Hence, it is possible to transmit the WDM light from the node 2-1 to the node 2-5 without any regenerators. Accordingly, it is possible to build the optical network 1 available for a long distance transmission at low cost.

Figure 13:
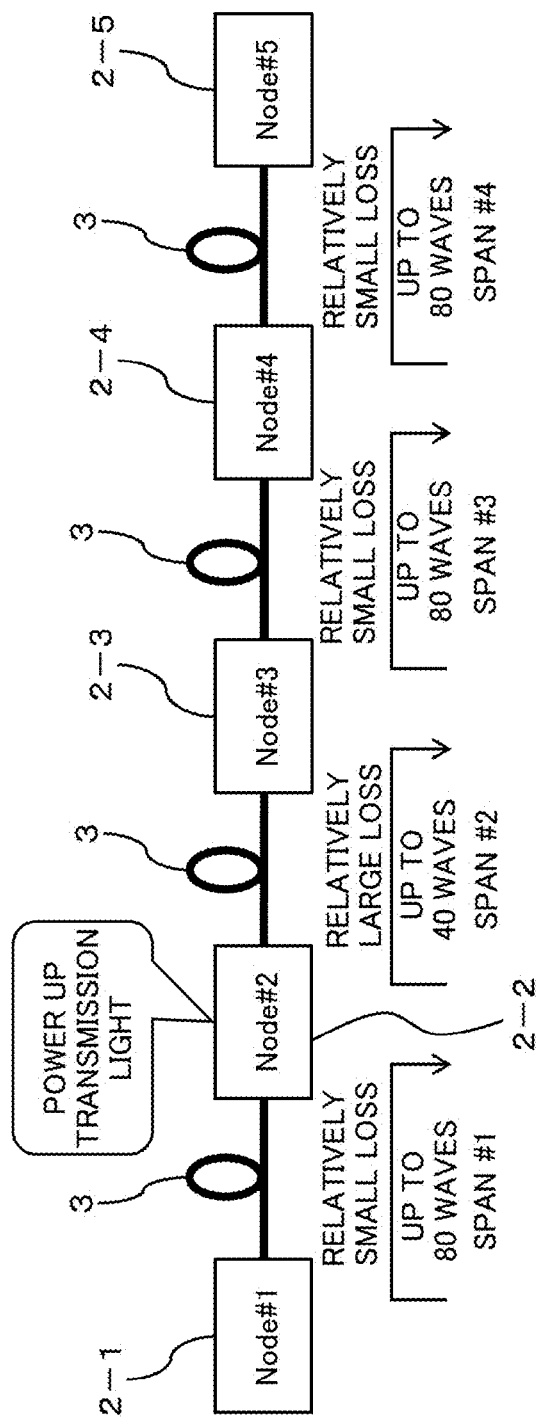
FIG. 13 is a diagram to explain that control to increase transmission optical power according to the number of limited wavelengths may be individually performed in the individual nodes in FIG. 10.

The control to increase the transmission optical power according to the limited number of wavelengths may be performed in the individual nodes 2. FIG. 13 illustrates an example thereof. FIG. 13 illustrates a case where a transmission line loss (may be referred to as the "span loss") between the node 2-2 and the node 2-3 (span #2) among the nodes 2-1 to 2-5 is larger than those in other spans #1, #3 and #4.

In the span #2 with span loss larger than those of the other spans #1, #3 and #4, the OSNR tends to deteriorate in comparison with the other spans #1, #3 and #4. The deterioration amount of the reception OSNR at a reception terminal node (e.g., node 2-5) is dominant in a span with a large span loss.

Hence, for example, the node 2-2 corresponding to a transmission node of the span #2 with the channel loss larger than those of the other spans may be controlled to increase transmission optical power according to the limited number of wavelengths (e.g., 40 wavelengths). Thus, it is not necessary to install a regenerator node in the span #2, or it is possible to reduce the number of regenerator nodes to be necessarily installed in the span #2.

Meanwhile, in the spans #1, #3 and #4 other than the span #2 between the node #2 and the node #3, since a span loss is less than that of the span #2, it is allowed to transmit WDM light without limiting the number of wavelengths (e.g., up to 80 wavelengths).

For example, a transmission of WDM light with 40 wavelengths at the maximum is available in each of the spans #1 to #4 between the nodes #1 and the node #5, and a transmission of WDM light with additional 40 wavelengths at the maximum (up to 80 wavelengths in total) is available in each of the spans #1, #3 and #4 other than the span #2.

Example of Transmission Optical Power Setting

In the optical network 1 in which the NMS 4 intensively monitors the nodes 2, the NMS 4 is available to identify a span with a span loss relatively larger (e.g., maximum) than those of other spans. It may be considered that a span loss of the span is dominant in the deterioration amount of the OSNR of the span.

Transmission line loss information of the optical network 1 may include span loss information for each span in the optical network 1. The span loss information is an example of indicators (or parameters) indicative of a transmission performance of the optical network 1.

The indicators (or parameters) may be referred to as the "network parameters". The network parameters may illustratively include information indicative of an output optical power and amplification characteristics of the transmission amplifier 25, and type information of the optical transmission line 3 (e.g., SSMF, NZ-DSF, DSF or the like). With respect to the node 2 provided with the reception amplifier 21, the network parameters may include information indicative of an output optical power and amplification characteristics of the reception amplifier 21.

Figure 14:
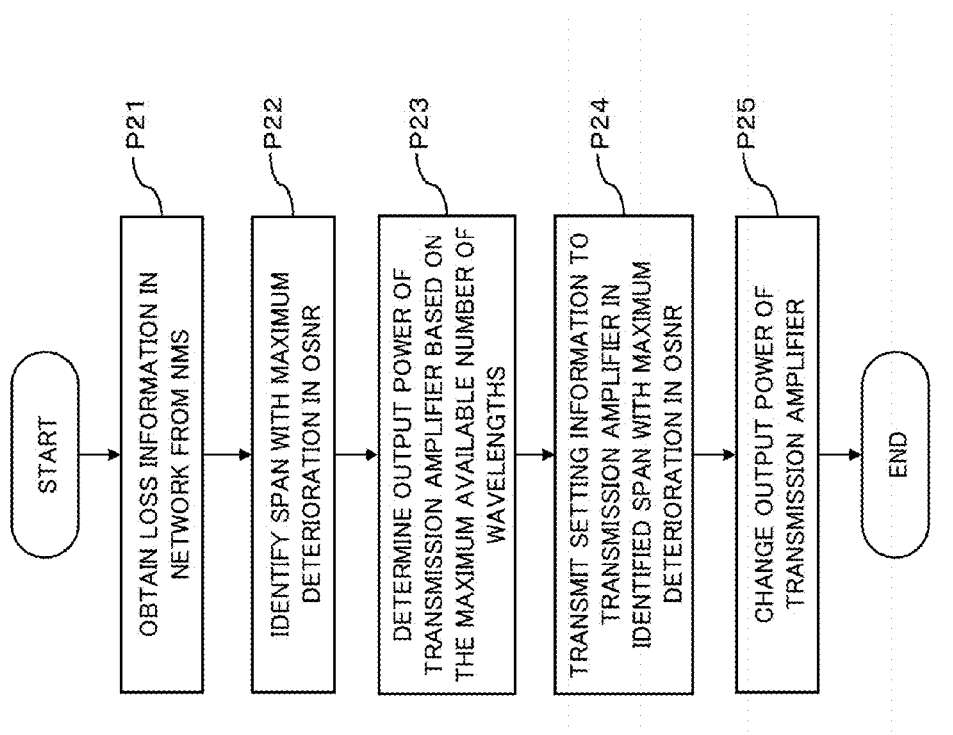
FIG. 14 is a flowchart illustrating an example of control to increase transmission optical power according to the limited number of wavelengths illustrated in FIG. 13.

The NMS 4 illustratively may store and manage the above network parameters. As illustrated in FIG. 14, by obtaining the network parameters (processing P21), the NMS 4 is available to identify a span with the maximum span loss, in other words, a span with the maximum deterioration amount in the OSNR (processing P22). This span is a target span to be limited the number of wavelengths, and may be referred to as the "number-of-wavelength limited span". The number-of-wavelength limited span corresponds to the span #2 illustrated in FIG. 13.

As illustrated in FIG. 13, the NMS 4 determines output optical power of the transmission amplifier 25 of the transmission node 2-2 in the identified number-of-wavelength limited span #2 (processing P23), and transmits setting information of pump light power corresponding to the determined output optical power, to the transmission node 2-2 (processing P24).

The transmission node 2-2 of the number-of-wavelength limited span #2 controls output optical power of the transmission amplifier 25 by setting and controlling pump light power of the pump LD 26 according to the setting information received from the NMS 4 (processing P25).

As described above, the optical network 1 can achieve an automated control of transmission optical power according to the limited number of wavelengths in the number-of-wavelength limited span with the maximum deterioration amount in the OSNR.

Even when the above-described automated control is performed, the reception node 2-5 corresponding to a reception terminal of an optical path may be unavailable to achieve the desired reception OSNR. In such a case, the NMS 4 may sequentially identify spans in descending order of deterioration amounts in the OSNRs and transmit output optical power setting information corresponding to the identified span to the transmission node 2 of the identified span, so that the reception OSNR at the node 2-5 reaches the desired OSNR.

In this way, it is possible to enable the reception node 2 to achieve the desired OSNR with the minimum requisite setting. As described above, it is possible to identify a span with a relatively large deterioration amount in the OSNR based on the span loss information. However, it is possible to identify such span more accurately by additionally using the aforementioned other network parameters. Accordingly, it is possible to improve accuracy to optimize the selection of a number-of-wavelength limited span and the transmission optical power control.

Example of Second Application to Optical Transmission System 1

Figure 15:
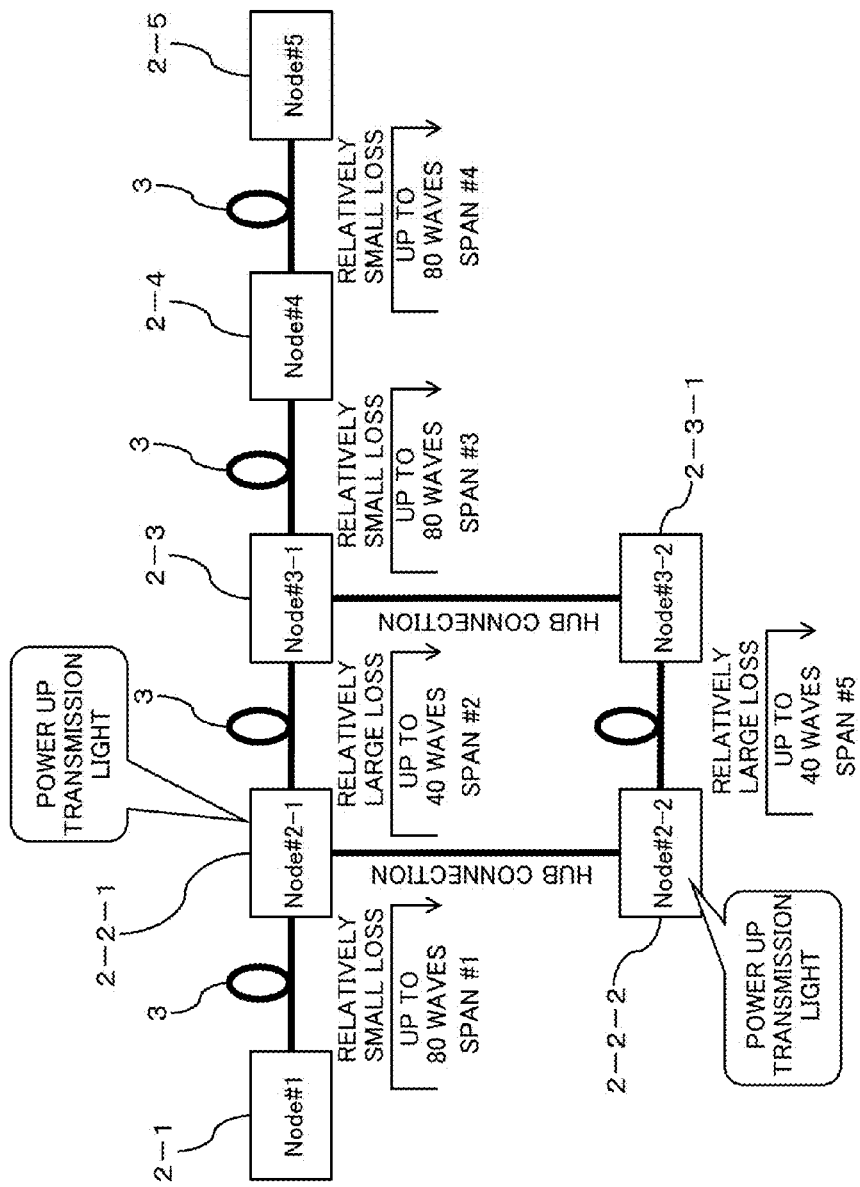
FIG. 15 is a block diagram illustrating a modified example of the optical transmission system illustrated in FIG. 13.

FIG. 15 is a block diagram illustrating a modified example of the optical network 1 illustrated in FIG. 13. The optical network 1 illustrated in FIG. 15 illustratively differs from the exemplary configuration illustrated in FIG. 13 in that additional nodes 2-2-1, 2-2-2, 2-3-1 and 2-3-2 are provided between the nodes 2-1 and node 2-4.

The node 2-2-1 (#2-1) may be considered as corresponding to the node 2-2 (#2) illustrated in FIG. 13, and the node 2-3-1 (#3-1) may be considered as corresponding to the node 2-3 (#3) illustrated in FIG. 13.

Focusing upon an optical communication in a direction from the node #1 to the node #5, the node 2-2-2 (#2-2) has, for example, a connection (which may be referred to as the "HUB connection") with the splitter 23 (see, for example, FIGS. 2 and 5 to 8) in the node 2-2-1 (#2-1). The direction from the node #1 to the node #5 may be referred to as a "downstream" for descriptive purpose.

Focusing upon an optical communication in the opposite direction from the node #5 to the node #1, the node #2-2 may have a HUB connection with the multiplexer 24 in the node #2-1. The opposite direction of the "downstream" may be referred to as the "upstream" for descriptive purpose.

Meanwhile, the node 2-3-2 (#3-2) has, focusing upon an optical communication in the downstream, a HUB connection with the multiplexer 24 (see, for example, FIGS. 2 and 5 to 8) in the node 2-3-1, for example. Focusing upon an optical communication in the upstream, the node #3-2 may have a HUB connection with the splitter 23 in the node #3-1, for example.

The HUB-connected nodes #2-2 and #3-2 may be referred to as the "HUB nodes #2-2 and #3-2", respectively, for descriptive purpose.

Further, the HUB nodes #2-2 and #3-2 of the span #5 are illustratively connected through the optical transmission line 3. It may be assumed that a span loss of the optical transmission line 3 is illustratively larger than those of the other spans #1, #3 and #4 similar to the span loss between the nodes #2-1 and #3-2 (i.e., span #2). The span loss of the span #2 may be the same as or different from the span loss of the span #5.

The nodes #2-1 and #2-2 may be the separate nodes 2 or may constitute a single node 2. Similarly, the nodes #3-1 and #3-2 may be the separate nodes 2 or may constitute a single node 2.

Focusing on the downstream, the splitter 23 of the node #2-1 is available to drop light of a part of wavelengths (for example, 40 wavelengths) of the WDM light (for example, with 80 wavelengths) received from the node #1 into the HUB node #2-2 through the HUB connection. The rest of undropped wavelength light is passed through to the node #3-1.

The HUB node #2-2 is available to receive the light (for example, the WDM light with 40 wavelengths) dropped by the node #2-1 through the HUB connection, and to transmit the received light to the HUB node #3-2 through the optical transmission line 3.

The HUB node #3-2 is available to transmit light received from the HUB node #2-2 to the multiplexer 24 of the node #3-1 through the HUB connection.

The node #3-1 is available to multiplex the light having passed through the node #2-1 and the light received from the HUB node #3-2 by using the multiplexer 24, and to transmit the multiplexed light to the node #4 of the downstream.

In the upstream, a part of the WDM light is dropped to the node #3-2 by the node #3-1 and is transmitted to the node #2-1 through the node #2-2. Further, the node #2-1 multiplexes the light having passed through the node #3-1 and the light received from the node #2-2 to transmit the multiplexed light to the node #1.

According to the network configuration illustrated in FIG. 15, the number-of-wavelength limited spans correspond to the spans #2 and #5 having span losses relatively larger than the other spans.

Hence, in the downstream, the transmission node #2-1 of the span #2 and the transmission node #2-2 of the span #5 correspond to target nodes of transmission optical power control according to the limited number of wavelengths.

In the upstream, a transmission node 2 of the span #2 corresponds to the node #3-1, and a transmission node 2 of the span #5 corresponds to the HUB node #3-2.

An identification of the number-of-wavelength limited span and a transmission of the setting information of pump light power to the target node 2 can be achieved by the aforementioned processing in the flowchart illustrated in FIG. 14.

According to the exemplary network configuration illustrated in FIG. 15, an increase control of transmission optical power according to the limited number of wavelengths (e.g., up to 40 wavelengths) is performed on each span #2 and #5. Therefore, it is not necessary to install a regenerator node in the spans #2 and #5, or it is possible to reduce the number of regenerator nodes to be necessarily installed in the spans #2 and #5.

Meanwhile, since the span losses of the spans #1, #3 and #4 other than the spans #2 and #5 are less than those of the spans #2 and #5, it is allowed to transmit WDM light without limiting the number of wavelengths (e.g., up to 80 wavelengths).

For example, a transmission of WDM light with 40 wavelengths at the maximum is available in each of the spans #1 to #5, and a transmission of WDM light with additional 40 wavelengths at the maximum (up to 80 wavelengths in total) is available in the spans #1, #3 and #4 other than the spans #2 and #5.

Accordingly, it is possible to transmit the WDM light with the maximum available number of wavelengths (e.g., 80 wavelengths) between all nodes (#1 to #5).

(Change of Wavelength Spacing)

It is available to increase a wavelength spacing (which may be referred to as a "wavelength grid") of the WDM light in the number-of-wavelength limited span compared to a wavelength spacing before the number of wavelengths is limited.

Figure 16:
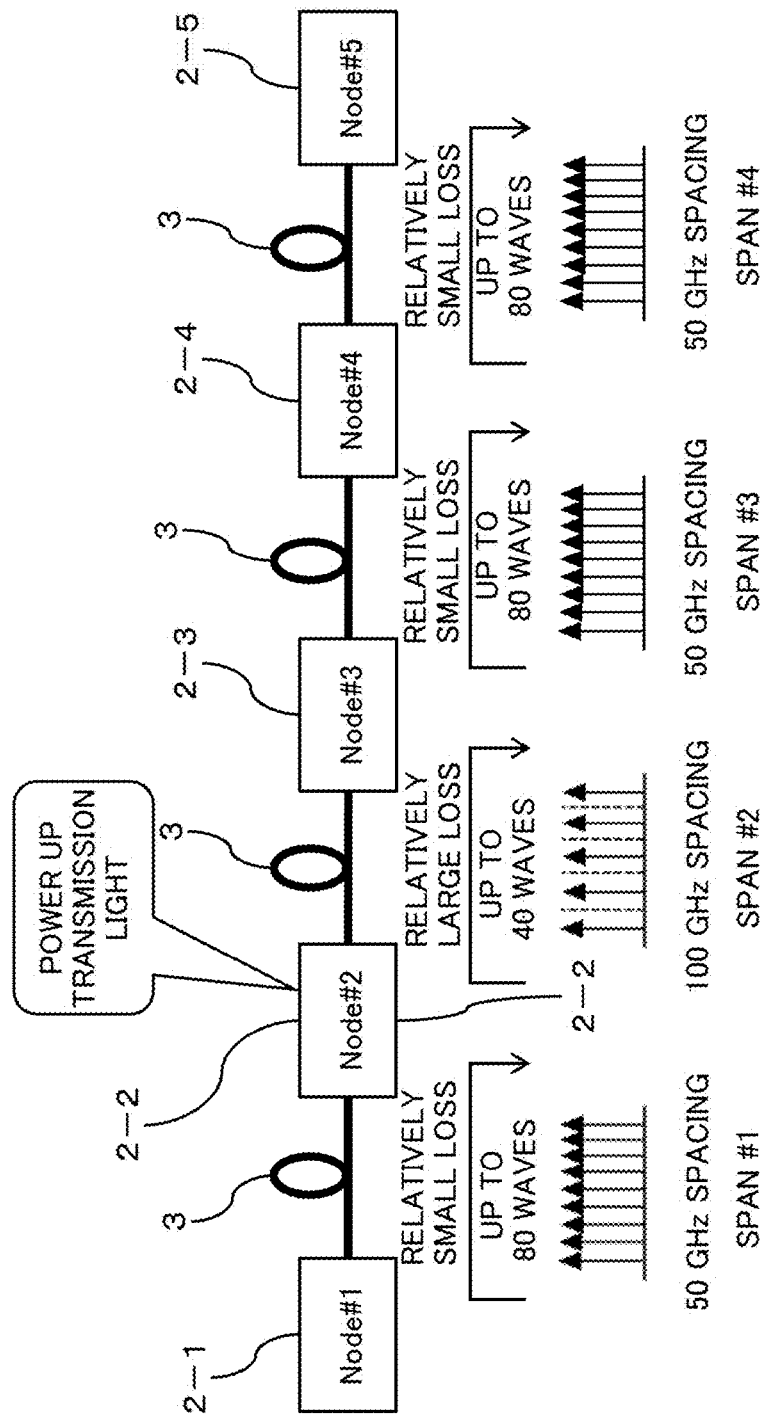
FIG. 16 is a diagram to explain that a wavelength spacing of WDM light in a number-of-wavelength limited span in the optical transmission system illustrated in FIG. 13 may be increased compared to a wavelength spacing before the number of wavelengths is limited.

For example, as illustrated in FIG. 16, WDM light with 80 wavelengths at the maximum arranged at wavelength spacing of 50 GHz is transmitted in the spans #1, #3 and #5 other than the number-of-wavelength limited span #2 among the spans #1 to #4.

Meanwhile, in the number-of-wavelength limited span #2, it is possible to transmit WDM light with 40 wavelengths at the maximum arranged at wavelength spacing of 100 GHz broader than 50 GHz.

By increasing wavelength spacing of the WDM light transmitted in the number-of-wavelength limited span #2, it is possible to reduce a non-linear penalty such as an XPM or a FWM in addition to the aforementioned OSNR improvement effect. Accordingly, it is possible to achieve a further improvement in optical transmission performance. The "XPM" is an abbreviation of cross-phase modulation, and the "FWM is an abbreviation of four-wave mixing.

(Monitor and Control of Wavelength Spacing)

Figure 17:
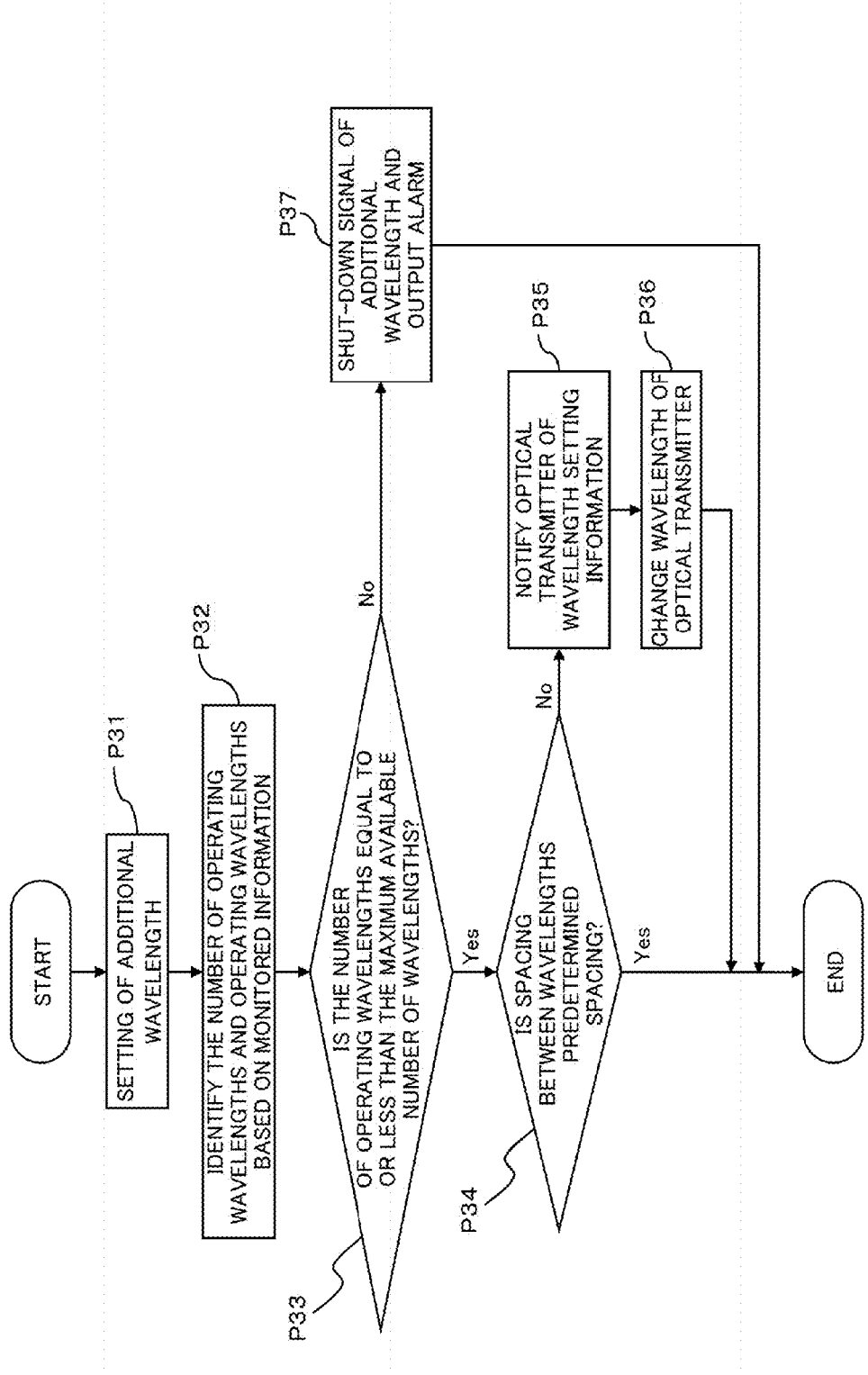
FIG. 17 is a flowchart illustrating an example of wavelength spacing control illustrated in FIG. 16.

FIG. 17 illustrates an example of wavelength spacing control described with reference to FIG. 16. The processing in the flowchart illustrated in FIG. 17 may be performed in the transmission node #2 of the number-of-wavelength limited span #2, for example.

For example, the flowchart illustrated in FIG. 17 may be performed by any one of the controller 27 and the controllers 27b to 27d. Hereinafter, the controller 27 and the controllers 27b to 27d will be collectively referred to as the "controller 27" for descriptive purpose.

As illustrated in FIG. 17, when the number of wavelengths multiplexed in the WDM light is increased, a connection setting for an additional wavelength is performed on the multiplexer 24 (processing P31). The connection setting is reflected in the aforementioned cross connect information, for example.

The controller 27 is available to identify the number of operating wavelengths and the wavelength spacing based on the cross connect information or the monitored information of the monitor 28 (processing P32). The controller 27 checks whether the identified number of operating wavelengths is equal to or less than the desired setting number of wavelengths (processing P33).

In response to a detection that the identified number of operating wavelengths is equal to or less than the desired setting number of wavelengths as a result of the check (Yes in the processing P33), the controller 27 further checks whether the identified wavelength spacing is the predetermined spacing (100 GHz spacing in the example in FIG. 16) (processing P34).

In response to a detection that the wavelengths spacing is not the predetermined spacing as a result of the check (No in the processing P34), the controller 27 notifies, for example, the optical transmitter 6 of wavelength setting information indicative of the predetermined spacing (processing P35).

The optical transmitter 6 controls transmission wavelengths to be wavelength spacing identified based on the wavelength setting information notified from the controller 27 (processing P36). The transmission wavelength can be controlled by controlling light emission wavelength of the tunable LD, for example. Instead of the wavelength setting information, the information notified to the optical transmitter 6 may be control information of a transmission wavelength corresponding to the wavelength spacing identified based on the wavelength setting information.

In this way, it is possible to monitor and control wavelength spacing under the limited number of wavelengths in the transmission node #2 of the number-of-wavelength limited span #2. Accordingly, as described above, it is possible to improve optical transmission performance according to the improvement in the OSNR and the reduction of a non-linear penalty.

In response to a detection that the number of operating wavelengths exceeds the desired setting number of wavelengths in the processing P33 in FIG. 17 (No in the processing P33), the controller 27 may reject the connection setting in the processing P33. For example, the controller 27 may perform control to shut down a transmission light source corresponding to a setting of additional wavelengths, and may output an alarm to the NMS 4 or an external device (processing P37).

The aforementioned monitor and control of the wavelength spacing may be performed in the NMS 4. By doing so, a target node 2 of the wavelength spacing control is not limited to the transmission node #2 of the number-of-wavelength limited span #2, and any nodes 2 can be the target node 2 of the wavelength spacing control.

According to an aspect of the above technique, it is possible to expand a transmission distance of wavelength-division multiplexed light at low cost.

All examples and conditional language provided herein are intended for pedagogical purposes to aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiment(s) of the present invention have been described in detail, it should be understood that the various changes, substitutions, and alterations could be made hereto without departing from the spirit and scope of the invention.

What is claimed is:

1. An optical amplification apparatus that amplifies input wavelength-division multiplexed light, the optical amplification apparatus comprising:
   a pump light source that outputs pump light; and
   an optical amplifier that amplifies the wavelength-division multiplexed light in response to a power level of the pump light,
   wherein the number of wavelengths multiplexed in the wavelength-division multiplexed light is set to a setting number equal to or less than the maximum available number of wavelengths available to be input to the optical amplification apparatus, and
   the power level of the pump light is determined according to the setting number.

2. The optical amplification apparatus according to claim 1, further comprising a controller that controls the power level of the pump light, wherein
   the controller controls the power level of the pump light according to the setting number.

3. The optical amplification apparatus according to claim 2, wherein the setting of the setting number for the controller is performed by a network management system that manages an optical network comprising the optical amplification apparatus.

4. The optical amplification apparatus according to claim 2, wherein the setting of the setting number is performed based on apparatus setting information on a number of wavelengths set to the optical amplification apparatus.

5. The optical amplification apparatus according to claim 1, further comprising:
a controller that controls a power level of the pump light; and
a monitor that monitors the number of wavelengths multiplexed in the wavelength-division multiplexed light,
the controller performs a setting of the setting number based on the number of wavelengths monitored by the monitor.

6. The optical amplification apparatus according to claim 5, wherein the controller outputs an alarm in response to a detection that the number of wavelengths monitored by the monitor exceeds the setting number.

7. The optical amplification apparatus according to claim 2, wherein the controller performs control to expand a wavelength spacing in the wavelength-division multiplexed light in response to a number of wavelengths equal to or less than the setting number.

8. An optical transmission apparatus comprising:
an optical amplification apparatus that amplifies input wavelength-division multiplexed light, wherein
the optical amplification apparatus comprises
a pump light source that outputs pump light, and
an optical amplifier that amplifies the wavelength-division multiplexed light in response to a power level of the pump light,
the number of wavelengths multiplexed in the wavelength-division multiplexed light is set to a setting number equal to or less than the maximum available number of wavelengths available to be input to the optical amplification apparatus, and
the power level of the pump light is determined according to the setting number.

9. An optical transmission system comprising:
a plurality of optical transmission apparatuses, wherein
any one or more of the optical transmission apparatuses includes an optical amplification apparatus that amplifies input wavelength-division multiplexed light,
the optical amplification apparatus comprises
a pump light source that outputs pump light, and
an optical amplifier that amplifies the wavelength-division multiplexed light in response to a power level of the pump light, and wherein
the number of wavelengths multiplexed in the wavelength-division multiplexed light is set to a setting number equal to or less than the maximum available number of wavelengths available to be input to the optical amplification apparatus, and
the power level of the pump light is determined according to the setting number.

10. The optical transmission system according to claim 9, wherein the optical transmission apparatus comprising the optical amplification apparatus is provided on a transmission side of a transmission span, the transmission span having an optical transmission loss greater than that of another transmission span.

* * * * *